(12) United States Patent
Rhyman

(10) Patent No.: US 6,467,817 B1
(45) Date of Patent: Oct. 22, 2002

(54) COUPLING DEVICE

(75) Inventor: Morgan Rhyman, Anderstorp (SE)

(73) Assignee: ABA of Sweden AB (SE)

( * ) Notice: Subject to any disclaimer, the term of this patent is extended or adjusted under 35 U.S.C. 154(b) by 0 days.

(21) Appl. No.: 09/529,332

(22) PCT Filed: Jun. 29, 1999

(86) PCT No.: PCT/SE99/01165

§ 371 (c)(1),
(2), (4) Date: Apr. 28, 2000

(87) PCT Pub. No.: WO00/09934

PCT Pub. Date: Feb. 24, 2000

(30) Foreign Application Priority Data

Aug. 11, 1998 (SE) ................................. 9802711

(51) Int. Cl.⁷ ................................................ F16L 37/00
(52) U.S. Cl. ......................... 285/319; 285/307; 285/921
(58) Field of Search ................................ 285/319, 307, 285/921

(56) References Cited

U.S. PATENT DOCUMENTS

| | | | | |
|---|---|---|---|---|
| 2,869,099 A | * | 1/1959 | Robinson | 285/319 X |
| 4,696,495 A | * | 9/1987 | Oliver | 285/319 X |
| 4,875,709 A | * | 10/1989 | Caroll et al. | 285/319 X |
| 4,989,905 A | * | 2/1991 | Rajecki | 285/319 X |
| 5,112,086 A | * | 5/1992 | Gruber et al. | 285/319 X |
| 5,407,236 A | * | 4/1995 | Schwarz et al. | 285/319 X |
| 5,607,190 A | * | 3/1997 | Exandier et al. | 285/319 X |
| 5,779,279 A | * | 7/1998 | Bartholomew | 285/319 X |
| 6,102,448 A | * | 8/2000 | Fixemer et al. | 285/921 X |
| 6,199,913 B1 | * | 3/2001 | Wang | 285/319 X |

FOREIGN PATENT DOCUMENTS

| | | |
|---|---|---|
| DE | 3525402 | 1/1987 |
| DE | 4003461 | 8/1990 |
| EP | 0529758 | 3/1993 |
| SE | 364946 | 11/1962 |
| WO | 9724545 | 7/1997 |

* cited by examiner

Primary Examiner—Lynne H. Browne
Assistant Examiner—David Bochna
(74) Attorney, Agent, or Firm—Orum & Roth

(57) ABSTRACT

A device for connecting two rigid tubular objects, comprising a male part and a female part. The male part is provided with at least one transverse edge in its outer wall. A sleeve-shaped element is arranged to be placed between said parts when inserting the male part into the female part, the element being provided with at least one resilient tongue with a first member which is arranged to resiliently engage the recess of the female part when inserting the element into the female part, and a second member which is arranged to resiliently snap into place behind the transverse edge of the male part when inserting the male part into the element. The resilient tongue allows the female part and the male part to be separated by turning the element relative to the male part to a position where the second member of the resilient tongue is arranged laterally of the transverse edge of the male part and/or by moving the first member of the resilient tongue out of engagement with the recess of the female part.

6 Claims, 2 Drawing Sheets

Figure 3:
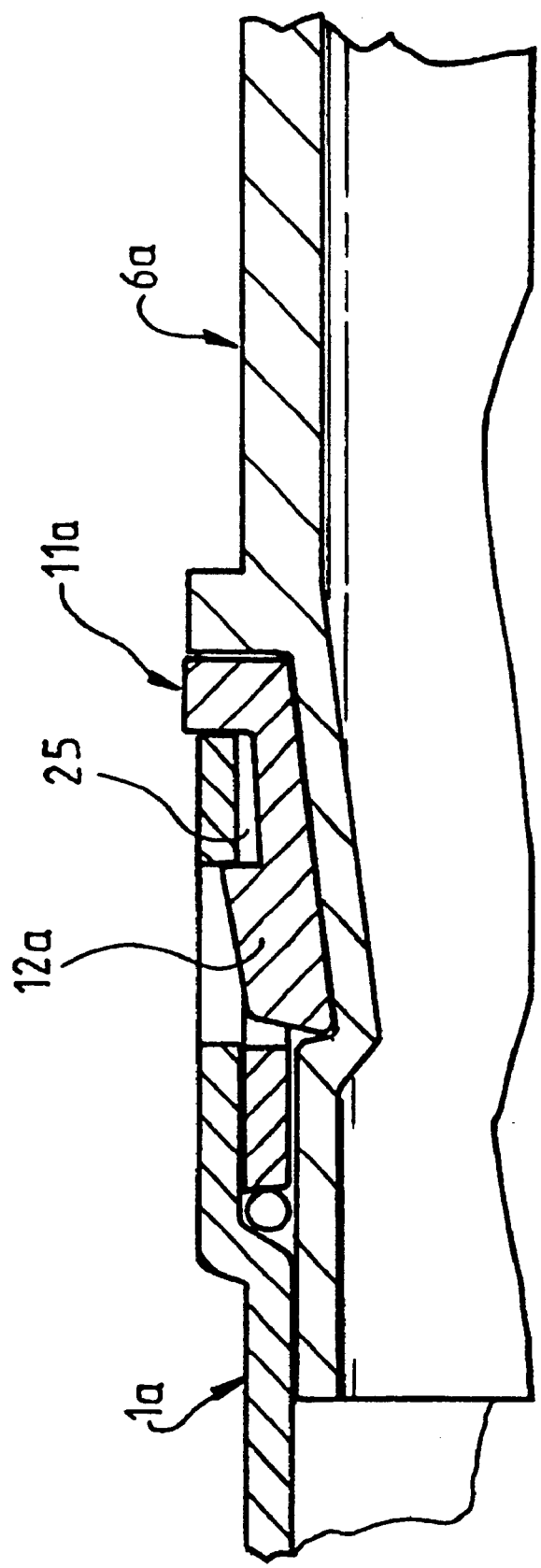

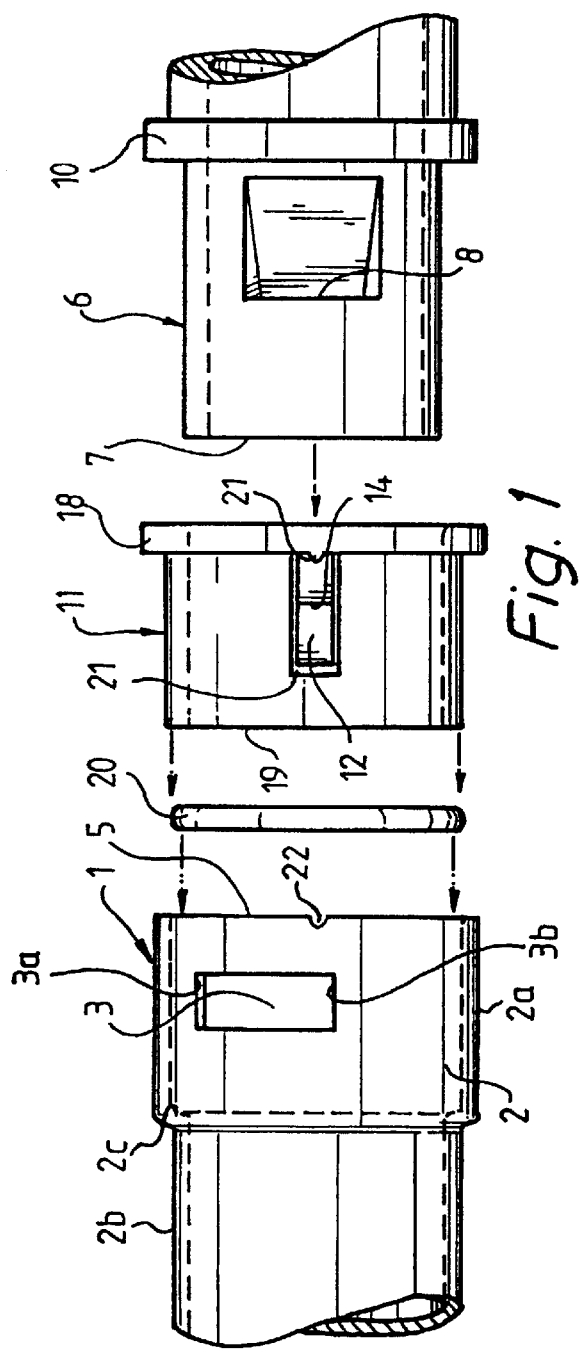
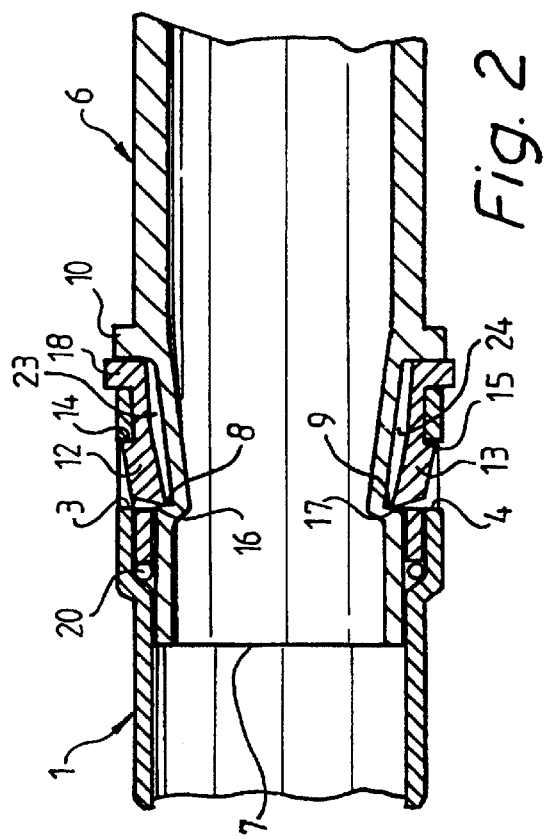

COUPLING DEVICE

The invention relates to a device for connecting two rigid tubular objects, comprising a male part and a female part which are interconnectable.

BACKGROUND OF THE INVENTION

Many types of couplings are known which are intended for interconnecting two hoses or a hose and a tube, i.e. at least one of the objects is made of an elastic material. PCT/SE96/01752 discloses, for instance, a female part in the form of a sleeve with resilient tongues and a male part in the form of a tube portion with transverse edges in its outer wall. When inserting the male part into the female part, the resilient tongues are arranged to resiliently snap into place behind the transverse edges of the male part and hence connect the female part to the male part. Thus, this structure only works if the tongues arranged in the female part are resilient. This in its turn means that at least the female part has to be attached to an object which is made of an elastic material, such as a conventional hose, to allow the female and male part to be separated by being turned.

However, none of the known couplings may be used for connecting two rigid objects, such as two tubes which are made of a rigid, nonelastic material since also the female part in this case is made of a rigid material.

The object of the present invention is therefore to provide a coupling device which can be used for connecting two rigid, preferably tubular objects such as two rigid plastic tubes.

SUMMARY OF THE INVENTION

According to the invention, this object is achieved by means of a device of the above-mentioned type, characterised in that the female part comprises a sleeve which at one of its ends is connected to or constitutes an inegral part of one of the above-mentioned objects and at its other end is provided with at least one recess, that he male part comprises a tube portion which at one of its ends is connected to or constitutes an integral part of the other of the above-mentioned objects and at its other end in its outer wall is provided with at least one transverse edge, and that a sleeve-shaped element is arranged to be placed between the parts when inserting the male part into the female part, the element being provided with at least one resilient tongue with a first means which is arranged to resiliently engage the recess of the female part when inserting the element into the female part, and a second means which is arranged to resiliently snap into place behind the transverse edge of the male part when inserting the male part into the element, the resilient tongue allowing the female part and the male part to be separated by turning the element relative to the male part to a position where the second means of the resilient tongue is arranged laterally of the transverse edge of the male part and/or by moving the first means of the resilient tongue out of engagement with the recess of the female part.

Moreover, the coupling device according to the invention is a simple as well as reliable coupling device which is also inexpensive to produce.

Other preferred features of the coupling device according to the present invention will be described in the appended claims.

DETAILED DESCRIPTION OF THE DRAWINGS

In the following, the invention will be described in more detail with reference to the accompanying schematic drawings, which by way of example show the currently preferred embodiments of the coupling device according to the present invention, and in which FIG. 1 is an exploded view of the coupling device according to a first embodiment, FIG. 2 is a cross-sectional view of the device according to FIG. 1 in a connected state, and FIG. 3 is a cross-sectional view of a part of the coupling device according to a second embodiment.

DETAILED DESCRIPTION

The coupling device according to the preferred embodiment comprises a female part 1 whose main component comprises a sleeve 2 which may be made, for instance, in the form of a tube of a rigid, nonelastic plastic mate rial. As is clear from FIG. 1, the sleeve 2 has at its mouth a mouth portion 2a with an outer and inner diameter larger than the remaining portion 2b of the sleeve, the transition between these portions being designated 2c. As is evident from FIG. 2, two diametrically opposite recesses 3, 4 are arranged in the mouth portion of the sleeve at the same distance from the mouth 5 of the sleeve 2. At its end (not shown) opposite the mouth, the female part is provided with, for instance, a threaded portion which is intended Lo be screwed into a first rigid plastic tube (not shown) or is formed integrally therewith.

The male part 6 in FIG. 1 comprises a tube portion provided at one of its ends (not shown) with a threaded portion that is intended to be screwed into a second, rigid plastic tube (not shown) which is to be connected to the first plastic tube. Alternatively, the male part may comprise a tube portion which is integrated in a unit such as a cooler. At its other end 7, the male part is provided with two diametrically opposite transverse edges 8, 9 in its outer wall, which are equally spaced from the end surface of the other end 7. These transverse edges may, for instance, be formed by removing material by milling in the outer wall of the male part. They may also be formed by pressing the material or, if the male part 6 is made of plastics, be formed by injection moulding of the male part. A transverse flange 10 is arranged on the male part at a greater distance from the other end 7 than are the transverse edges 8,9 of the female part.

As is evident from FIG. 1, a sleeve-shaped element 11 is adapted to be placed between the parts when inserting the male part into the female part, the element being provided with two diametrically opposite resilient tongues 12, 13. As is better explained by FIG. 2, each resilient tongue 12 and 13 is provided with a thickened portion at its free outer end to form a stop lug 14 and 15, respectively, protruding from the outer wall of the element. The stop lug 14 and 15 are arranged to resiliently engage the recesses 3 and 4 of the female part, respectively, when inserting the element into the female part. The free outer end of each resilient tongue 12 and 13 forms, at its side abutting against the transverse edge 8 and 9, respectively, of the male part, a stopping edge 16 and 17, respectively, protruding from the inner wall of the element. The stopping edges are arranged to resiliently snap into place behind the transverse edges of the male part when inserting the male part into the element 11. As is further evident from FIG. 2, the undersides of the resilient tongues have a concave shape, which results in spaces 23, 24 being formed between the resilient tongues and the outer wall of the male part at its transverse edges when inserting the male part into the element. FIG. 3 shows that the underside of each resilient tongue 12a may in return have a more linear shape, which results in the corresponding space disappearing at the same time as, in exchange, a space 25 is formed between the outside of the resilient tongue and the inside of the female part 1a at the mouth thereof. Instead of forming the resilient tongues in different ways, naturally the outside of the male part may be formed in different ways so that the size of the space between the resilient tongues and the male part at the transverse edges thereof is decreased or increased.

The element is further at one of its outer ends provided with a transverse flange 18, which is arranged to abut against the mouth 5 of the sleeve when the respective stop lugs of the resilient tongues engage the respective recesses in the female part 1. In order to facilitate the joining of the female part and the element, the element 11 is provided with a nose 21 at its transverse flange 18, while the female part at its mouth 5 is provided with a recess 22 which has a form matching the nose.

FIG. 2 further shows that the outer diameter of the element 11 is somewhat smaller than the inner diameter of the female part at the mouth portion 2a, while it is greater than the inner diameter of the remaining portion 2b, which approximately corresponds to the inner diameter of the element. The wall thickness of the element thus equals approximately half the difference between the inner diameter of the mouth portion and that of the remaining portion. Furthermore, the length of the element between its transverse flange 18 and the opposite outer end 19 is somewhat shorter than the length of the mouth portion of the female part, which results in the opposite outer end 19 being located at a short distance in front of the transition 2c between the first and the remaining portion of the sleeve 2 as the transverse flange 18 of the element abuts against the mouth 5 of the sleeve.

In the transition 2c between the mouth portion 2a of the sleeve and its remaining portion 2b, an O-ring 20 is further arranged to sealingly abut against the inside of the sleeve as well as against the outer wall of the male part 6 in the connected state of the device.

FIG. 2 further shows that the outer diameter of the male part along a portion between its other end 7 and the transverse flange 10 is somewhat smaller than the inner diameter of both the element and the remaining portion and that the length of this portion is greater than the length of mouth portion 2a of the female part, which results in the other end 7 of the male part extending a distance into the remaining portion 2b of the sleeve past the said opposite outer end 19 of the element when the transverse flange 10 of the male part abuts against the transverse flange 18 of the element. When the first plastic tube is to be connected to the second plastic tube, the female part 1 and the male part 1 are attached to the respective plastic tubes unless they are formed by injection moulding as an integral part of the tubes. Then the O-ring 20 is placed in the transition 2c between the mouth portion of the female part and the remaining portion. Subsequently, the element 11 is inserted into the female part 1, its resilient tongues 12 and 13 being placed in such a manner relative to the recesses 3, 4 of the female part that the nose 21 engages the recess 22 at the mouth of the female part. Hence, the stop lugs 14, 15 engage the recesses 3, 4 and abut against one of the side edges 3b in FIG. 1, i.e. in a so-called correct turning position. In this way, one obtains a clear visual indication of the female part and the element being interconnected correctly without having to listen for the snapping sound when the stop lugs engage the recesses 3,4, or having to check the interconnection by trying to once again pull the parts apart. In this correct turning position, the opposite outer end 19 of the element is pressed against the O-ring 10 at the same time as its transverse flange 18 abuts against the mouth 5 of the female part. Then the male part 6 is inserted into the element 11 with its transverse edges 8 and 9 placed opposite the resilient tongues 12, 13 so far that the stopping edges of the resilient tongues snap into place behind the transverse edges of the male part and thus attach the male part to the element, which in its turn is attached to the female part. The coupling of the female part 1 and the male part 6 thus constitutes a quick coupling. Besides, it is important to notice that in the present coupling device, contrary to the coupling device according to the above-mentioned PCT application, axial force arising in connection with use causes a turning of the outer end of the resilient tongue in a downward direction towards the male part, which means that the stronger the axial force the better the attachment of the resilient tongue to the female and male part. In the prior-art coupling device, the axial force, in return, acts as a direct pressure in the resilient tongue, which thus has to withstand the whole pressure so as not to bend, and therefore has to have greater dimensions than the resilient tongue in the present coupling device.

In the embodiment of the resilient tongue as shown in FIG. 2, the separation of the male part 6 and the female part 1 may be effected by turning the resilient tongues of the element by means of its transverse flange 18 relative to the male part so far that the stopping edges 16, 17 of the resilient tongues 12, 13 are arranged laterally of the transverse edges 8, 9 of the male part, in which position its stop lugs abut against the opposite side edges 3a of the recesses. The separation of these parts may also be effected by pressing the stop lugs 14, 15 of the resilient tongues out of engagement with the recesses 3, 4 of the female part. This is possible thanks to the spaces 23, 24 under the resilient tongues. In the embodiment of the resilient tongues shown in FIG. 3, the separation of the male part and the female part may, however, only occur by turning the stopping edges of the resilient tongues, so that they are arranged laterally of the transverse edges of the male part. During turning, the male part is thus disengaged from the element, which is still connected to the female part by means of the stop lugs of the resilient tongues, whereas the female part, when being pressed, is disengaged from the element, which is still connected to the male part. Then the element may be disengaged from the female part and the male part, respectively, by pressing and turning, respectively.

The invention is not limited to the shown and described embodiment, and may be varied in several ways within the scope of the appended claims. Consequently, the female part 1 may be provided with one or more, for instance four, recesses instead of two recesses, which in he case of three recesses are evenly distributed round he sleeve at the same distance from the mouth 5 of the sleeve, the male part 6 and the element 11 being provided with the same number of transverse edges and resilient tongues, respectively, as the number of recesses, and are also evenly distributed round the male part and the element, respectively, at the same distance from the transverse flanges thereof. It is also possible to form the male part and the element without transverse flanges 10 and 18, respectively, the element in that case having to be turned relative to the male part indirectly by the intermediary of the female part. The correct relative turning position of the female part and the element can, of course, be indicated in a way other than by means of a recess 22 at the mouth of the female part 1 and a nose 21 at the transverse flange 18 of the element 11, for example with scribed lines or colour markings in the material of these parts. Moreover, it is possible for reasons of safety to arrange two O-rings 20 in the transition 2c between the mouth portion of the sleeve and the remaining portion. Naturally, it is also possible to form the male part, the female part and the tubular objects which are to be interconnected with a shape other than a circular-cylindrical one, for instance rectangular, square, etc.

What is claimed is:

1. A device for connecting two rigid tubular objects, comprising:

a male part and a female part which are interconnectable, the female part having a sleeve receiving section connectable with one of the objects and an opposite end which is connectable with the other object, the sleeve receiving section having at least one recess, the male part having at a first end a tube portion connectable with one of the rigid tubular objects and having a second end, a sleeve element arranged and constructed to be placed between said male and female parts when inserting the male part into the female part, the sleeve element having at least one resilient tongue, the tongue having a first engagement means arranged and constructed to resiliently engage the recess of the female part when inserting the sleeve into the female part, and a second engagement means arranged and constructed to resiliently snap into position behind a transverse edge of the male part when inserting the male part into the sleeve, the male part having a tongue receiving recess, at least one longitudinal angled surface disposed at an edge of the tongue receiving recess, the resilient tongue arranged and constructed such that upon rotation of the sleeve with respect to the male part the angled surface coacts with the tongue to push the resilient tongue out of engagement with the tongue receiving recess, to allow withdrawal of the male part from the sleeve element and the female part.

2. A device according to claim 1, wherein the second engagement means of the tongue comprises an angled transverse surface defining an acute angled point which, upon application of a force to the device tending to separate the male part from the female part coacts with a transverse surface of the tongue receiving recess to drive the tongue toward a longitudinal centerline of the male part.

3. A device according to claim 2, said second engagement means comprising a protruding lug arranged and constructed to abut the transverse edge of the male part.

4. A device according to claim 2, further comprising a circumferential sleeve flange disposed at one end of the sleeve, the sleeve flange being arranged and constructed to abut a circumferential edge of the female part, upon insertion of the sleeve into the female part.

5. A device according to claim 4, further comprising a circumferential male sleeve flange disposed at a distance from a distal end of the male part, the male sleeve flange being arranged and constructed to abut the sleeve flange upon insertion of the male part into the sleeve.

6. A device according to claim 5, further comprising an O-ring disposed at an interface between the sleeve, the female part, and the male part.

* * * * *